March 28, 1950 E. C. STREETER, JR 2,501,748
SYNTHESIZED STEREOSCOPIC RANGE INDICATION
Filed March 9, 1943 3 Sheets-Sheet 1
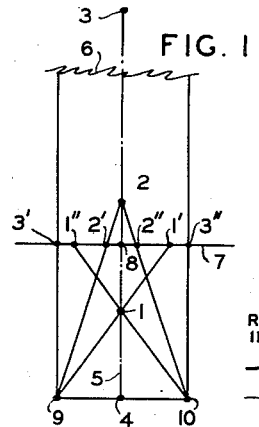
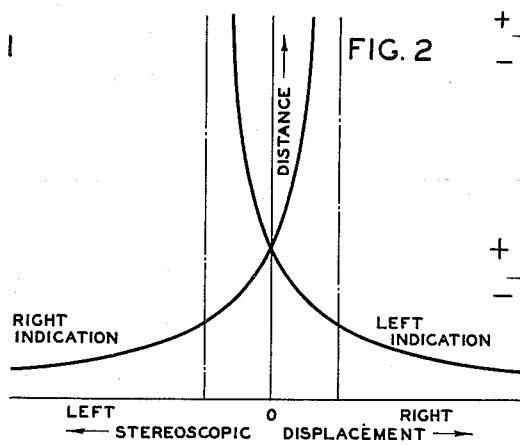
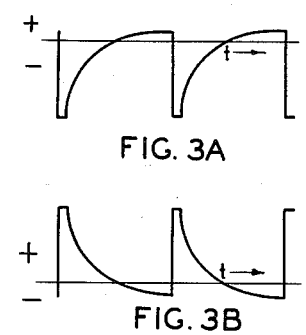
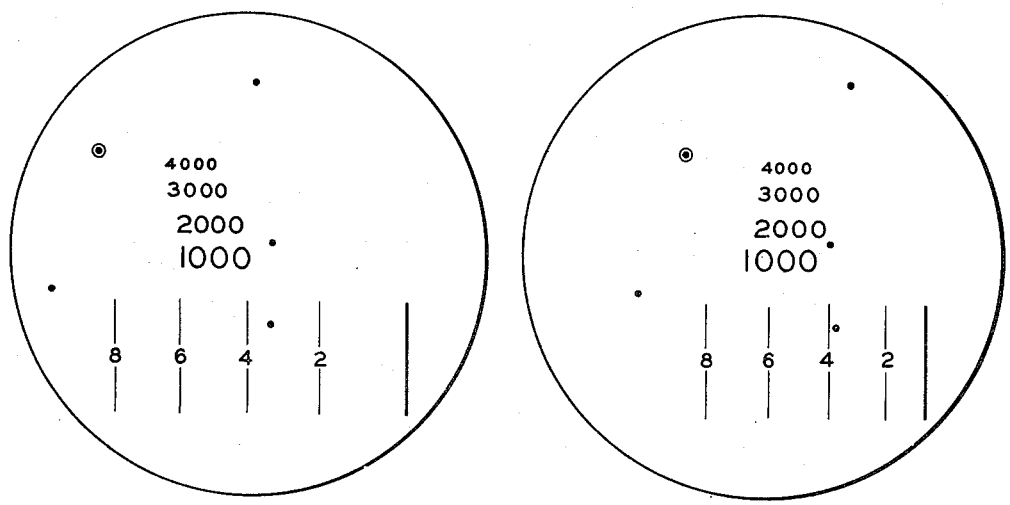
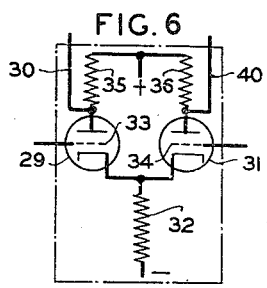
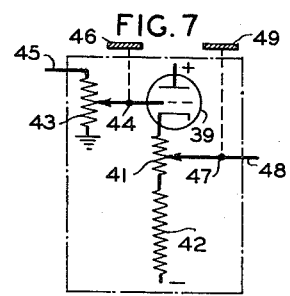
INVENTOR
E. C. STREETER, JR.
BY
ATTORNEY March 28, 1950     E. C. STREETER, JR     2,501,748
SYNTHESIZED STEREOSCOPIC RANGE INDICATION
Filed March 9, 1943     3 Sheets-Sheet 2

INVENTOR
E. C. STREETER, JR.
BY
ATTORNEY

March 28, 1950     E. C. STREETER, JR     2,501,748
SYNTHESIZED STEREOSCOPIC RANGE INDICATION
Filed March 9, 1943     3 Sheets-Sheet 3
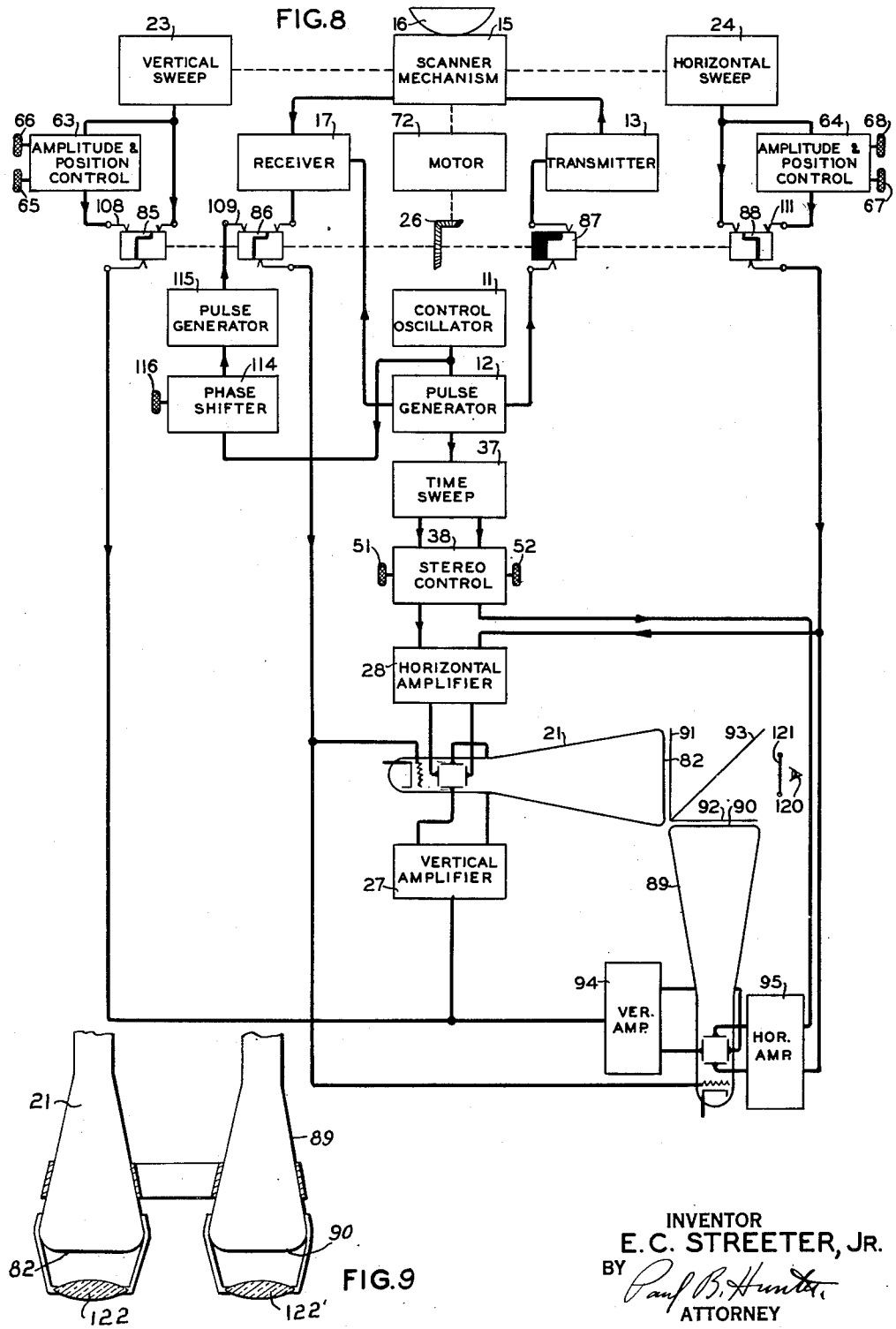
INVENTOR
E. C. STREETER, JR.
BY
ATTORNEY Patented Mar. 28, 1950

2,501,748

UNITED STATES PATENT OFFICE 2,501,748

SYNTHESIZED STEREOSCOPIC RANGE INDICATION

Edward C. Streeter, Jr., Old Westbury, N. Y., assignor to The Sperry Corporation, a corporation of Delaware Application March 9, 1943, Serial No. 478,583

15 Claims. (Cl. 343—11)

The present invention relates generally to stereoscopic range finders and more particularly to stereoscopic distance determination in microwave object detecting and locating systems.

Means for producing a three-dimensional picture of remote objects have been disclosed in copending patent application Serial No. 458,109, titled "Synthesized stereoscopic vision," and filed September 12, 1942, in the name of W. A. Ayres. In that application, the stereoscopic picture is synthesized from the positional data obtainable by a reflected pulse type of microwave object detecting and locating system employing a single electromagnetic energy collector, and is adapted to reveal the positional relationships of a plurality of objects in a realistic and instinctively comprehensible manner.

It is often desirable, however, in such applications as aircraft interception and aircraft gun laying, to have an absolute range scale with which the relative distances of objects may be compared and to be able to determine accurately the range of an individual object without destroying the goniometric indication of the measured object and its positional relationship to other objects.

Some forms of range scales have been disclosed and claimed in copending patent application Serial No. 478,586 titled "Stereoscopic range indication," and filed March 9, 1943, now Patent No. 2,426,979, which issued September 9, 1947, in the name of W. A. Ayres.

The principal object of this invention is to provide an improved apparatus for and method of producing synthesized stereoscopic range indication for use with microwave object detecting and locating systems that produce a three-dimensional picture of the area scanned.

Another object is to provide an absolute distance scale simultaneously observable in relation to all objects detected in a desired scanning area.

Yet another object lies in the provision of electronic means for stereoscopically determining the accurate range of an individual object while maintaining undisturbed an indication of the relative positions of all objects detected in a desired scanning area.

A further object is to superimpose on a three-dimensional picture of detected objects reproduced by a cathode ray indicator a stereoscopic range scale which may be electronically positioned at will to facilitate depth comparisons.

Still another object is to provide range indices superimposed upon the three-dimensional presentation of detected objects and subjected to the same stereoscopic displacements.

A yet further object is to provide a stereoscopic range indication whose accuracy is substantially independent of the functional relationship between stereoscopic displacement and distance.

Other objects and advantages will become apparent from the following specification, taken in connection with the accompanying drawings wherein the invention is embodied in concrete form.

In the drawings,

Fig. 1 is a diagram illustrating the meaning of the terms "goniometric position" and "stereoscopic displacement" as employed in the specification and claims.

Fig. 2 is a graph of the stereoscopic displacement of an image on an indicator screen as a function of the distance from the viewpoint to the corresponding object.

Figs. 3A and 3B are oscillograms of time sweep waves corresponding to the stereoscopic displacement curves of Fig. 2.

Fig. 4 is a stereoscopic drawing which illustrates some of the possible types of range indications and which may be observed in three-dimensional relief by means of an ordinary stereoscope.

Fig. 6 is a schematic wiring diagram of a push-pull output amplifier having two single-ended inputs.

Fig. 7 is a schematic wiring diagram of a gain and direct voltage level control.

Fig. 8 is a block diagram of a further embodiment of the present invention.

Fig. 9 is an illustration of a modified viewing arrangement applicable to the system of Fig. 5 or that of Fig. 8.

Figure 5:
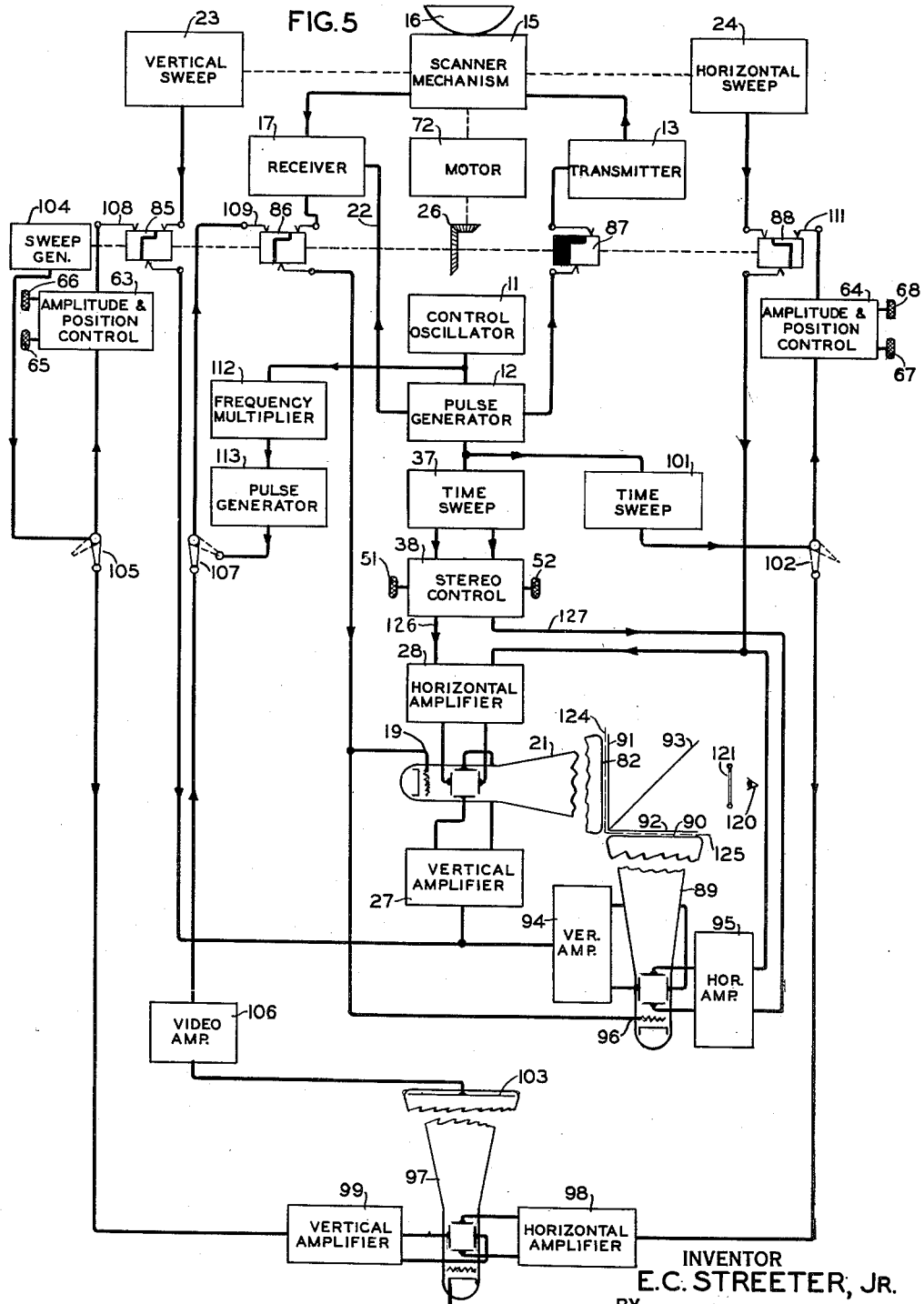
Fig. 5 is a block diagram of a simplified microwave object detecting and locating system employing an embodiment of the present invention.

Similar characters of reference are used in all of the above figures to indicate corresponding parts. In Figs. 5 and 8 arrows are provided to indicate the direction of control or energy flow.

The theory underlying the present invention may be more readily understood by reference to Figs. 1 and 2. In Fig. 1 objects symbolized by dots 1, 2, and 3 lie at distances increasing in numerical order from a viewpoint 4. For clarity and simplicity in illustration, all the objects are assumed to be on the same line of sight 5. This line is broken at 6 to show that object 3 lies at an extremely great distance. Now assume a surface 7 at some distance from the viewpoint 4. The points at which the lines of sight to objects pierce the surface 7 may be termed the goniometric positions of images of objects as represented on surface 7. The goniometrically positioned images corresponding to objects 1, 2, and 3 are coincident at a point 8. It is seen that all objects having the same bearing from a singular viewpoint possess images whose goniometric positions superimpose irrespective of the distance to the corresponding objects.

Assume now that viewpoint 4 is replaced by imaginary left and right viewpoints 9 and 10, respectively, separated by an effective interocular distance. Left and right rays passing through the objects pierce the surface 7 to form dual images, 1', 2', and 3' for the left viewpoint 9, and 1'', 2'', and 3'' for the right viewpoint 10. It is seen that images 1' and 1'' corresponding to object 1 lying in front of the surface 7 are displaced from the goniometric position 8 to the right and left, respectively, while images 2' and 2'' corresponding to object 2 lying beyond surface 7 suffer a reverse displacement from the goniometric position 8, being to the left and right, respectively. Images corresponding to objects lying on the surface would not be displaced from the goniometric position. Since object 3 is assumed extremely distant, left and right rays to this object are substantially parallel to sighting line 5, and images 3' and 3'', therefore, have substantially the same separation as points 9 and 10, that is, the effective interocular distance. The lateral displacement of images from their goniometric positions caused by the assumption of imaginary right and left viewpoints may be called stereoscopic displacement and evidently varies according to distance. Fig. 2 illustrates the general relationship between stereoscopic displacement of images and distance of the corresponding objects from the viewpoint 4.

A stereoscopic indication of objects 1, 2, and 3 may be achieved by providing an indicator screen having images thereon positioned similarly to those on surface 7 where images 1', 2', and 3' are visible only to the left eye of an observer while images 1'', 2'', and 3'' are perceived only by the observer's right eye. Images seen by the left eye are paired in the observer's brain with complementary images seen by the right eye, and the fusion results in a perception of depth relationships between the objects 1, 2, and 3.

W. A. Ayres has disclosed in the above-mentioned copending application Serial No. 458,109, that such a stereoscopic indication may be produced synthetically by goniometrically positioning images according to the bearings of objects as located by a single scanning radiator, and stereoscopic displacing these images according to the distance to the respective objects. It was further revealed that only one viewpoint is thus necessary if the distance to all objects is determinable.

The reflected-pulse type of microwave object detecting and locating system is particularly adapted to provide three-dimensional pictures of the area scanned because the distance to detected objects is proportional to the transit time between the transmission of a pulse and the reception of the pulse after reflection from the objects. A time sweep wave may readily be synchronized with the transmission of pulses to provide an instantaneous amplitude which is a function of distance. The scanning agent of an indicator such as the electron beam of a cathode ray tube may be deflected in proportion to this instantaneous amplitude with the result that the stereoscopic displacement of the luminous image varies with distance in accordance with the characteristics of the time sweep wave.

Figs. 3A and 3B illustrate the time sweep waves corresponding to the stereoscopic displacement curves of Fig. 2. These curves represent the realistic relationship between displacement and distance but may often be adequately approximated by an exponential or linear shape over the desired distance limits. Any other wave shape may be employed to suit the particular need. The amplitude of the time sweep wave determines the stereoscopic contrast between nearest and furthest images while the average value or direct component determines the apparent distance to the indicator surface. It is preferable that the time sweeps employed for the right and left eye indications be equal and opposite to avoid distortion of the apparent bearings of objects.

According to the present invention range scales or indices may be provided in such varied forms as numerals, pips, lines, circles, etc., superimposed on the stereoscopic indication of objects. Fig. 4 illustrates some of the possible reference markings as they might appear on a cathode ray tube screen. The left circle is the indication intended only for the left eye while the right circle is the indication intended only for the right eye. Some typical means for producing this general type of indication are now discussed.

Referring now to Fig. 5, one embodiment of the present invention is disclosed as employed in a reflected-pulse type of microwave system. In the system illustrated a control oscillator 11 of any well-known type provides a voltage of suitable synchronizing frequency which may be in the audio range. The output of oscillator 11 is connected to a pulse generator 12 which converts the substantially sinusoidal oscillations fed to it into pulses of any desired shape, magnitude, and duration, having a repetition rate equal to the frequency of oscillator 11. This device employs a well-known clipping, differentiating, and other suitable wave shaping circuits in a conventional manner and consequently seems to require no further explanation.

Sharp trigger pulses are supplied to a pulse transmitter 13 through a commutator 87. These trigger pulses cause an ultra high frequency oscillator such as a magnetron to be biased on momentarily. Transmitter 13 is thus made to produce extremely short pulses of perhaps one microsecond duration. These pulses of carrier frequency are fed to a scanner mechanism 15.

The scanner 15 may be of the general type shown in copending application Serial No. 438,388, filed April 10, 1942, now Patent No. 2,410,831, which issued November 12, 1946, in the names of L. A. Maybarduk et al. although the invention is in no way limited to any particular mode of scanning. Such a scanning device is adapted to scan a predetermined solid angle up to and including a complete hemisphere by means of a spiral conical motion of a sharply directive radiant energy beam. This motion is provided by rapidly spinning a radiator indicated at 16 about one axis while slowly nodding the radiating system about a second axis perpendicular to and rotating with the first axis.

The transmitter pulses are emitted in a narrow club-shaped beam from the radiator 16, and the frequency of the control oscillator 11 is chosen sufficiently high to insure that all objects within the field of view are irradiated by at least one pulse during the scanning cycle. Radiator 16 serves also to receive energy reflected from objects during intervals between successive transmission periods and to supply the reflected energy to a receiver 17.

The receiver 17 and the transmitter 13 are electrically isolated by means of well known gas-filled resonators incorporated in the connections to the radiator 16. These resonators are responsive to the difference in power between transmitted and received pulses and provide an automatic switching action which not only prevents appreciable transfer of generated power directly to the receiver, but also eliminates loss of received energy in the transmitter. Examples of these switching resonators have been disclosed by W. L. Barrow et al. in copending application Serial No. 466,530, entitled Ultra high frequency devices, and filed November 20, 1942, Patent No. 2,454,761 granted November 30, 1948.

The receiver 17 amplifies and detects the received pulses in the usual manner and applies them through a commutator 86 to control grids 19 and 96 of cathode ray indicators 21 and 89, respectively. To further insure that no transmitted pulses directly affect the receiver 17, blanking pulses may be furnished from the pulse generator 12 over a line 22 in order to bias the receiver to insensitivity for the duration of each transmitted pulse. The detected pulses on the grid 19 turn on the electron beam of the indicator 21 after a delay behind their respective transmitted pulses according to the time required for radiant energy to travel to the point of reflection and return. The reflected energy thus produces images on the faces 82 and 90 of the indicators 21 and 89, respectively, which correspond to irradiated objects.

The images of detected objects are goniometrically positioned on indicator faces 82 and 90 by means of a vertical sweep circuit 23 and a horizontal sweep circuit 24, mechanically connected to the scanner mechanism 15 and adapted to convert the scanning motion of the radiant beam into corresponding electron beam-deflecting potentials for the cathode ray indicators 21 and 89. Circuit 23 connects through commutator 85 to vertical deflection amplifiers 27 and 94 of indicators 21 and 89, respectively. Circuit 24 connects through commutator 88 to horizontal deflection amplifiers 28 and 95 of indicators 21 and 89, respectively.

The amplifiers 27, 28, 94 and 95 may conveniently be of the type shown in Fig. 6 having a push-pull output and two single-ended inputs. Here two identical tubes 29 and 31 have in common a high resistance cathode load 32 maintained at a large negative potential. A signal applied to either control grid 33 or 34 appears across plate resistors 35 and 36 with opposite polarity and substantial equal magnitude. Cathode ray deflecting electrodes directly coupled to leads 30 and 40 displace the electron beam according to the sum of the impressed voltages whether alternating or direct. The operating potential on the tubes 29 and 31 being the same on each deflecting electrode causes no beam deflection.

The images of detected objects are stereoscopically displaced from their goniometric positions on the indicator faces 82 and 90 by the employment of a time sweep circuit 37 and associated stereo control circuit 38 acting to supply the horizontal deflection amplifiers 28 and 95 with stereoscopic displacement waves. The pulse generator 12 triggers the time sweep circuit 37 coincident with the transmission of radiant pulses from radiator 16. The instantaneous amplitude of the sweep voltage may be any desired function of time such as a substantially hyperbolic, exponential, or linear wave according to the desired stereoscopic displacement wave. Since sweep circuits are well known, no detailed discussion is necessary. The output wave of the sweep circuit 37 is fed in push-pull to the stereo control circuit 38 which may comprise two cathode-follower stages each similar to the one illustrated in Fig. 7.

The cathode-follower stage shown in Fig. 7 comprises a tube 39 attached to a cathode load consisting of a voltage divider 41 in series with a high fixed resistor 42, the combination being connected to a source several hundred volts negative with respect to ground. The midpoint of the voltage divider 41 is approximately at ground potential. An adjustable tap 47 is electrically connected to an output lead 48 and mechanically adjusted by a direct voltage level control knob 49. A voltage divider 43 is connected between an input lead 45 and ground. An adjustable tap 44 connects to the control grid of tube 39 and provides a means of amplitude control through mechanically attached knob 46.

The stereo control 38 is provided with a knob 51 to allow simultaneous adjustment of the amplitudes of the stereoscopic displacement waves passing through its two cathode-follower stages. Control circuit 38 is further provided with a knob 52 to facilitate alteration of the direct voltage level of these waves by preferably equal and opposite amounts. One stage of the circuit 38 has an output lead 126 upon which its stereoscopic displacement wave is impressed, while the parallel stage of the circuit 38 has an output lead 127 to which the substantially mirror image of the above wave is supplied. Leads 126 and 127 are connected to the second inputs of the horizontal deflection amplifiers 28 and 95, respectively, in whose outputs the stereoscopic displacement waves are algebraically added to the goniometric potential from sweep circuit 24. Images therefore appear on the indicator faces 82 and 90 suitably placed for right or left eye indications, and viewing means are provided to enable an observer at a viewpoint 120 to see these indications as a unified three-dimensional picture.

The following viewing means may be employed to permit the right and left eyes of the observer to see only the indications intended for the respective eyes, the left eye indication being obscured from the right eye and vice versa. Indicator 21 has an optically polarizing screen 91 placed in front of it while indicator 89 spaced 90° away from indicator 21 in a common plane has a screen 92 placed before it similar to screen 91 but polarized at substantially right angles thereto. These screens may be made of commercially available transparent sheets adapted to plane polarize the light they transmit. The oscilloscope pictures as viewed through these screens are, therefore, optically polarized in a plane corresponding to the angle of rotation of the screens about the line of sight. A semi-transparent mirror 93 bisects the angle between the two faces 82 and 90 of indicators 21 and 89, respectively, so that conventional two-dimensional patterns may be exactly superimposed as seen from viewpoint 120. If the faces 82 and 90 are observed from viewpoint 120 through polarizing eye glasses, indicated at 121, the right and left lens transmitting only vertical and horizontal polarizing light, respectively, the observer's right and left eyes respond only to those indications intended for these eyes. The dual images corresponding to each object are fused in the brain of the observer and provide a three-dimensional picture.

It is to be understood that other viewing means, such as those shown in above-mentioned copending application Serial No. 458,109, may be alternatively employed. For example, as illustrated in Fig. 9 of the present application, the cathode ray tubes 21 and 89 may be arranged in mutually parallel positions, with the axes spaced according to the average interocular distance. They may be provided with lenses 122, 122' for the observer's left eye and right eye respectively, and so arranged that the left eye views only screen 82 through lens 122 and the right eye sees only screen 90 through lens 122'. Arranged in this fashion, the screens 82 and 90 are substantially coplanar, occupying positions corresponding to those of the left view and right view respectively, of the printed cards in common use in ordinary stereoscopes. Also, with this arrangement, the lenses 122 and 122' correspond substantially with the lenses of the ordinary stereoscopes.

In the embodiment of Fig. 5, range indices exist as a two-dimensional pattern formed on a target 103 in a picture source cathode ray tube 97. This pattern is analyzed in terms of video signals and scanning potentials and is reproduced on the indicator faces 82 and 90. The process is so timed that stereoscopic displacement waves from stereo control circuit 38 when added to the scanning potentials cause the range indices to appear in three-dimensions. For this purpose the following means are provided.

The picture source cathode ray tube 97 projects a constant intensity electron beam at the target 103, placed parallel and adjacent the face of the tube. The target 103 is preferably made of metal having a high secondary emission ratio such as aluminum foil with a natural oxide coating. The desired range pattern may be printed on the surface of target 103 in carbon ink or other material having a secondary emission ratio appreciably different from the natural oxide. Variations in the secondary emission current from the range pattern as the target 103 is scanned produce video signals corresponding to the indices to be reproduced. Since the difference in magnitudes of secondary emission determines the video current, it is possible to develop a greater signal than would be provided by the use of the primary current of the electron beam alone. Picture source tube 97 is provided with horizontal and vertical deflection amplifiers 98 and 99, respectively.

The pattern provided on the target 103 is swept horizontally by the electron beam according to the deflection of a time sweep wave applied to amplifier 98 from a circuit 101 through a switch 102. This time sweep is synchronized by the pulse generator 12 so that the commencement and end of the horizontal deflection of the beam in tube 97 occurs at the same instant as the commencement and end of the stereoscopic displacement waves from circuit 38. The electron beam is positioned on the target 103 such that the commencement of the time sweep corresponds to the zero distance index on the printed pattern. The distance indices are so spaced in relation to the shape of the time sweep wave from the circuit 101 that the transit time of the scanning electron beam passing from one of the indices to the next is twice that required for the propagation of electromagnetic energy over a distance in space corresponding to the difference between these indices. For example, if the time sweep from circuit 101 is linear, the indices are linearly spaced on target 103, and the electron beam reaches a particular index in the time interval between the radiation of a pulse and the reception of the pulse returned from a reflecting object positioned at the distance corresponding to this index.

A vertical sweep is supplied through a switch 105 to amplifier 99 from a low frequency sweep generator 104 having a repetition rate which is mechanically synchronized with the scanning period of the radiator 16. The vertical sweep is preferably but not necessarily linear to provide an even distribution of the horizontal lines over the target 103. Simple rectangular scanning of the range pattern is thus produced having a pictorial definition which is determined by the number of cycles of the control frequency that occur during each reproduction period of the range indices. The signal output from tube 97 is amplified by a video amplifier 106 and impressed on the contact 109 of commutator 86. The vertical and horizontal range sweeps from sources 104 and 101 are connected through amplitude and position controls 63 and 64, respectively, to contacts 108 and 111 of commutators 85 and 88, respectively. Controls 63 and 64 are similar to the circuit shown in Fig. 7 and have amplitude control knobs 65 and 67, respectively, corresponding to knob 46 and positioning control knobs 66 and 68, respectively, corresponding to knob 49.

The commutators 85, 86, and 88 permit the placement of the range indices as thus analyzed in terms of video signals and scanning potentials upon the indicator faces 82 and 90. The commutators are represented as having insulating portions in black and conducting segments in white. The momentary position of the commutators illustrated in Fig. 5 corresponds to about mid-period of the stereoscopic indication of objects. A motor 72 driving the radiator mechanism 15 also rotates the commutators through gearing 26 whose ratio is adjusted so that the range indication is switched on to the grids and deflection plates of the indicators at the end of each scanning period of the radial beam. This introduces little loss of the scanned area. For example, if spiral mechanical scanning is employed, a portion or all of the last spin cycle may be used for inserting the range indication. During periods of range indication vertical and horizontal sweep circuits 23 and 24, respectively, and receiver 17 are disconnected from the indicators 21 and 89 while transmitter 13 is deprived of trigger pulses from generator 12. During this same period the inputs of amplifiers 28 and 95 are connected to contact 111 on the commutator 88, amplifiers 27 and 94 are connected to contact 108 on the commutator 85, and grids 19 and 96 of the indicators 21 and 89 are supplied signals through contact 109.

When the commutators apply the range potentials to the indicators 21 and 89, patterns are reproduced on each indicator substantially like the original but stereoscopically displaced. Since the stereoscopic displacement waves are the same for object and range indications and the timing of the video pulses from the range indices is the same as the reflected pulses from objects at corresponding distances, it is seen that the range indices are only dependent for accuracy on the shape of the time sweep on the target 103 and the correct placement of both ends of the sweep. The position of the entire range indication, the apparent plane of the indicator, the size of the range indication, and the stereoscopic contrast may all be adjusted by the various control knobs according to the needs of the observer, the type of range indices employed and the desired appearance of detected objects.

Another means for range indication is illustrated in Fig. 5 which provides range markings consisting of horizontal or vertical lines but which, due to the extreme simplicity of the circuits, does not allow for the designation of these lines by numerals. Switches 105, 107, and 102 are thrown to the positions indicated by the dashed lines thereby disconnecting the picture source tube 97 from the system. A frequency multiplier 112 connected to the control oscillator 11 provides a wave at a desired multiple of the control frequency. A pulse generator 113 forms the multiple frequency wave into distance reference pulses which are fed to contact 109. These pulses when supplied to the grids of tubes 21 and 89 turn on the electron beams a multiple of times during each cycle of the sweeps from the circuits 38 and 101. Since the reference pulses occur at a harmonic of the control frequency, the time spacing is dependent for accuracy only on this frequency, and therefore the distance corresponding to the pulses is substantially independent of the characteristics of the sweep wave from circuit 101. Variation in the wave from circuit 101 alters the spacing between distance reference pulses on the indicator faces but does not affect the stereoscopic displacement of these pulses. The low frequency sweep generator 104 forms the pulses into substantially continuous vertical lines.

It is to be understood that the sweep axes of circuits 104 and 101 may be interchanged to provide a range indication of horizontal lines which are vertically spaced or in the case of patterns originating in picture source tube 97, numerals or other range indices which may extend either upwards or downwards on the indicator faces. If numbers are employed on the target 103, it is preferable that they be associated with appropriate vertical or horizontal lines to fix the exact range referred to because the different portions of each numeral appear to lie at slightly different distances.

Under certain conditions transparent film indicated at 124 and 125 with appropriate range indices marked thereon may be utilized in the embodiment of Fig. 5 mounted on mechanically adjustable supports in front of indicator faces 82 and 90 or permanent markings on these faces may be all that is necessary for certain limited applications.

Referring now to Fig. 8, there is illustrated means for accurately determining the distance to individual objects by stereoscopic comparison while maintaining the three-dimensional indication of all objects. The radio system, commutators, and indicators are identical to those shown in Fig. 5 but alternate means are provided for range sweep and grid modulating potentials. Inputs of circuits 63 and 64 are connected to vertical and horizontal sweep circuits 23 and 24, respectively, to provide modified versions of these voltages at contacts 108 and 111, respectively. The grid potentials for the range indication are obtained by phase shifting the control frequency wave in a phase shifter 114 having a continuously variable adjustment knob 116 which is calibrated in terms of distance. The output wave from the phase shifter 114 is formed into pulses by a pulse generator 115. When the range indication is switched on to tubes 21 and 89 by the commutators, the distance reference pulses form substantially contiguous images which are swept into a line, ellipse or circle by the sweep waves from circuits 63 and 64. The dimensions of the distance reference trace may be set at will by amplitude control knobs 65 and 67 and the position of the trace may be adjusted by position knobs 66 and 68. The stereoscopic bias of the trace is determined by the phase shift introduced by the phase shifter 114. As in Fig. 5, the period during the last spin cycle of the radiant beam may be utilized for supplying the range indication.

One method of utilizing this type of indication is to form a small circle by appropriately adjusting the amplitude of the vertical and horizontal range sweeps and to place the range index concentric with the goniometric position of the dual images, the distance to whose object is to be determined. The phase shift control 116 is then adjusted until the range index is subjected to the same time delay as that encountered between the transmission of a pulse to the object under measurement and the reception of the pulse after reflection therefrom. This naturally corresponds to the phase shift which causes the range index to appear in the same plane as the object. The distance to this object is then read directly off the calibrated control knob 116. If it is so desired, the positioning knobs 66 and 68 may also be calibrated so that the angles of the object measured with respect to the center of the indication may be directly determined.

Since there is wide variation in the types of mechanical and electronic scanning encountered in object locator systems and in the particular range indication requirements of these systems, many changes or rearrangements could be made in the above construction to suit specific needs and many apparently widely different embodiments of this invention could be made without departing from the scope thereof, it being intended that all matter contained in the above description or shown in the accompanying drawings shall be interpreted as illustrative and not in a limiting sense.

What is claimed is:

1. Radio object detecting apparatus comprising transmitting means for irradiating an object periodically with electromagnetic energy pulses, receiving means for deriving signals from a portion of said energy pulses reflected from said object, indicator means for forming dual images of said object, a source of distance reference signals, said source being connected to said indicator means for forming dual range indices, and means for stereoscopically separating the respective portions of said dual images and said dual indices as a function of the time interval between transmission and reception of pulses.

2. In a radio locator system wherein goniometric images are formed on an indicating screen in response to reflections from irradiated objects, the combination comprising means for forming range indices on said indicating screen, and means for stereoscopically displacing said images and said range indices.

3. In a radio locator system wherein goniometrically located images are formed on a screen in response to reflections from irradiated objects, the combination comprising means for forming on said screen separated images of each of said objects, means for superimposing separated range indices thereon, and means for controlling the separation spacing of said images and said range indices as a periodic function of time to provide stereoscopic effects.

4. In a radio object detecting and locating system wherein distance to an object is determined by the time interval between the transmission of radiant energy and the reception of a portion of said energy reflected from the object, the combination comprising indicator means actuated by said reflected energy for forming images of said object on a viewing screen, means for generating range reference signals, means for delaying said signals for substantially the same interval as the transit time between transmission and reception of said radiant energy, said signal delaying means being connected to said indicator means for forming range indices on said viewing screen, and means for stereoscopically displacing said images and said range indices, respectively.

5. Radio object detecting apparatus comprising transmitting means for irradiating an object periodically with electromagentic energy pulses, receiving means for deriving signals from a portion of said energy pulses reflected from said object, indicator means for forming dual images from said signals, means for generating distance reference signals at a multiple of the periodicity of said energy pulses, said reference signals being supplied to said indicator means for forming dual range indices, and means for stereoscopically separating the respective portions of said dual images and dual indices as a function of the time interval between transmission and reception of energy pulses.

6. Radio object detecting apparatus comprising transmitting means for irradiating an object periodically with electromagnetic energy pulses, receiving means for deriving signals from a portion of said energy pulses reflected from said object, indicator means for forming dual images from said signals, means for generating distance reference signals including an electron beam tube having a target therein upon which distance indices are reproduced, time sweep means for periodically scanning said target with an electron beam to produce video signals from said indices, said electron beam being deflected during a time interval to an index designating the distance of an object determined by said time interval, said video signals being supplied to said indicator means for forming dual range indices, and means for stereoscopically separating the respective portions of said dual images and said dual indices as a function of the time interval between transmission and reception of pulses.

7. In a radio object detecting and locating system wherein distance of an object is determined by the time interval between the transmission of radiant energy and the reception of a portion of said energy reflected from the object, means for generating distance reference signals comprising an electron beam tube having a target therein upon which distance indices are formed, and sweep generating means for periodically causing an electron beam to scan said target to produce video signals from said indices, said generating means being adjusted to deflect said beam to an index in twice the time interval required to transmit radiant energy to a distance corresponding to said index.

8. In a radio object detecting and locating system wherein distance of an object is determined by the time interval between the transmission of radiant energy and the reception of a portion of said energy reflected from the object, means for generating distance reference signals comprising an electron beam tube having a target therein upon which distance indices are formed and sweep generating means for periodically causing an electron beam to scan said target to produce video signals from said indices, said electron beam being deflected during a time interval to an index designating the distance of an object determined by said time interval.

9. In a radio system for object detecting and locating, the combination comprising means for producing electromagnetic energy in pulses, a radiator for irradiating an object with said pulses, receiver means, a control wave generator operating at the pulse rate frequency, phase shifting means connected to said generator for delaying said waves for a time equal to the interval between the radiation of a pulse and the reception of a reflected pulse, means supplied by said phase shifting means for forming said delayed waves into distance reference pulses, indicator means for producing dual images from both said received pulse and said delayed pulse, and means for stereoscopically displacing said respective images.

10. In a radio object detecting and locating system wherein distance to an object is determined by the time interval between the transmission of radiant energy and the reception of a portion of said energy reflected from the object, the combination comprising indicator means for producing dual images of the object, means for goniometrically positioning said images, means for supplying distance reference signals to said indicator means to form dual distance indices, displacement means for stereoscopically displacing said images and said indices, respectively, as a function of said time interval, said distance reference signals being supplied at a time such that the stereoscopic displacements of said indices are substantially equal to the stereoscopic displacements of said images.

11. Apparatus for timing a periodic interval comprising a source of periodic timing signals, a source of signals having the same period as said timing signals but delayed an unknown time interval with respect thereto, indicating means supplied by said sources for forming dual images from said signals, means producing a time sweep having the same period as said timing signals and a known phase relative thereto for separating respective portions of said images laterally, and stereoscopic viewing means for determining said time interval by revealing the apparent depth relationship of said images.

12. A radio system comprising a receiver of radio signals, a source of reference signals, control means for producing timing signals delayed a predetermined interval with respect to said reference signals, indicating means supplied by said receiver and said control means for forming dual images from said radio and timing signals, respectively, time sweep means synchronized by said reference signals for laterally separating portions of said respective images extents dependent upon the intervals between said reference signals and said radio and timing signals, respectively, and means for revealing the separated portions of said respective images to the separate eyes of an observer.

13. In apparatus adapted to indicate the time interval between recurrent signals, a source of recurrent reference signals, control means for producing timing signals delayed a predetermined interval with respect to said reference signals, a second source of recurrent signals having an unknown time delay with respect to said reference signals, indicating means supplied by said control means and said second source for forming dual images from said timing signals and said delayed signals, respectively, time sweep means synchronized by said reference signals for laterally separating portions of said respective images extents dependent upon the intervals between said reference signals and said timing signals and said delayed signals, respectively, and stereoscopic viewing means for determining said time delay by revealing the apparent depth of the image representing said second source relative to the image representing said control means.

14. Radio locating apparatus comprising, means for transmitting pulses at a regular repetition rate, means for receiving reflected pulses, a pair of cathode ray tubes each having a screen lying in a common plane and spaced apart from one another, means for stereoscopically viewing said screens, indicia on each of said screens, the indicia on one screen being laterally spaced from the indicia on the other screen to such an extent as to produce an indicia of predetermined depth when stereoscopically viewed, means for producing images of the received, reflected pulses on the screens of the two cathode ray oscilloscopes, means for laterally displacing said images relatively to one another a distance equal to the lateral displacement between indicia, whereby when stereoscopically viewed, the resulting image will appear to have the same depth as said indicia, and whereby if said images are otherwise laterally displaced, the resulting image will appear to lie either behind or in front of said indicia, and means for compensating for any such otherwise lateral displacement.

15. The combination according to claim 14, in which said indicia comprises locally generated regularly repeated signals applied to the screen of the cathode ray oscilloscopes.

EDWARD C. STREETER, JR.

REFERENCES CITED

The following references are of record in the file of this patent:

UNITED STATES PATENTS

| Number | Name | Date |
| --- | --- | --- |
| 2,107,464 | Zworykin | Feb. 8, 1938 |
| 2,301,254 | Carnhan | Nov. 10, 1942 |